United States Patent [19]

Dobreski et al.

[11] Patent Number: 5,290,866
[45] Date of Patent: Mar. 1, 1994

[54] FILMS OF BLENDS OF LINEAR ETHYLENE POLYMERS AND ACRYLIC POLYMERS

[75] Inventors: David V. Dobreski, Fairport, N.Y.; Jack J. Donaldson, Galesburg, Ill.

[73] Assignee: Mobil Oil Corporation, Fairfax, Va.

[21] Appl. No.: 868,972

[22] Filed: Apr. 16, 1992

Related U.S. Application Data

[63] Continuation-in-part of Ser. No. 107,125, Oct. 9, 1987, abandoned.

[51] Int. Cl.$^5$ .................. C08L 23/20; C08L 23/08; C08L 33/12
[52] U.S. Cl. ................................. 525/227; 525/221; 525/93; 525/228
[58] Field of Search ........................................ 525/227

[56] References Cited

U.S. PATENT DOCUMENTS

| | | | |
|---|---|---|---|
| 3,252,934 | 5/1966 | Jankens | 260/33.4 |
| 4,076,698 | 2/1978 | Anderson et al. | 526/348.6 |
| 4,156,703 | 5/1979 | Harrop | 260/876 R |
| 4,374,882 | 2/1983 | Harlan | 525/227 |
| 4,579,912 | 4/1986 | Canterino et al. | 525/240 |
| 4,760,116 | 7/1988 | Roberts | 525/227 |

FOREIGN PATENT DOCUMENTS 58419  4/1969  Luxembourg .

OTHER PUBLICATIONS

Kirk–Othmer, Encyclopedia of Chemical Technology, pp. 385–401 (1981).

*Primary Examiner*—Carman J. Seccuro, Jr.
*Attorney, Agent, or Firm*—Alexander J. McKillop; George W. Hager, Jr.

[57] ABSTRACT

The present invention relates to a film comprising a low density linear ethylene copolymer of ethylene and a higher olefin and up to about 10 percent by weight of the total composition of an acrylic polymer.

6 Claims, No Drawings

FILMS OF BLENDS OF LINEAR ETHYLENE POLYMERS AND ACRYLIC POLYMERS

This is a continuation-in-part of copending application Ser. No. 07/107,125 filed on Oct. 9, 1987, now abandoned.

CROSS-REFERENCE TO RELATED APPLICATIONS

This application is related to commonly assigned, copending application now U.S. Pat. No. 4,814,385.

BACKGROUND OF THE INVENTION

This invention relates to films and more particularly to films such as blown films, cast films and the like, prepared form linear ethylene polymers and small amounts of acrylic polymers.

Linear low and medium density polyethylene copolymers (LLDPE), and linear high density polyethylene are known materials which are widely commercially available. LLDPE is also described in U.S. Pat. No. 4,076,698 which is incorporated herein by reference. A commercially important use of LLDPE is in films which are conventionally prepared by blown film extrusion. Such films have generally good properties but often exhibit undesirably low stiffness for some uses and have marginal MD tear characteristics.

In accordance with U.S. Pat. No. 4,579,912, MD tear can be improved by blending LLDPE with aromatic polymers such as polystyrene or poly(para-methylstyrene). Furthermore, the stiffness of LLDPE is improved without loss of MD tear.

The present invention also relates to improved LLDPE blends and a method for preparing improved films, preferably blown films, made therefrom.

SUMMARY OF THE INVENTION

In one aspect, this invention relates to films comprising blends of from about 90 to about 99 weight percent linear ethylene polymers and small amounts, for example, from about 1 to about 10 weight percent, preferably from about 3 to about 5 weight percent, of an acrylic homopolymer or copolymer derived from one or more monomers having the general formula:

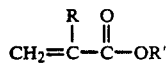

wherein R is hydrogen, methyl or ethyl and R' is alkyl having from 1 to about 8 carbon atoms. Illustrative of polymers derived from monomers having the aforementioned formula include, for example, poly(acrylic acid), poly(methacrylic acid), poly(methyl methacrylate), poly(methacrylate), poly(ethacrylate), poly(ethyl acrylate), poly(butyl acrylate) and the like.

In another embodiment of the present invention, a method of improving the MD tear strength and other physical properties of films, preferably blown films, prepared from linear ethylene polymers is provided by adding the hereinabove-identified acrylic polymer to said linear ethylene copolymers.

DETAILED DESCRIPTION OF THE INVENTION

In accordance with this invention, the MD (machine direction) tear strength and other physical properties of ethylene polymers, particularly LLDPE can be improved or, as is often desirable, the same MD tear strength can be obtained in a film of greater stiffness (see Secant modulus) and dramatically improved impact strength (Spencer Impact). This is accomplished herein by blending from about 1 to about 10 weight percent, preferably up to about 5 weight percent, and most preferably between about 3 and 5 weight percent, based on the total composition, of an amorphous acrylic polymer with the LLDPE.

The ethylene polymers which are contemplated for use in this invention are those generally prepared by low pressure techniques. Many such polymers are commercially available. Particularly suitable are LLDPE resins which are copolymers of ethylene and higher olefins, particularly 1-butene, 1-hexene, and 1-octene. These LLDPE copolymers generally have a density of between 0.80 and 0.94 g/cc., preferably between 0.91 and 0.93 g/cc.

Preferably, the acrylic polymer, which is blended with the LLDPE in the practice of the present invention, is selected so that its melt viscosity is less than the melt viscosity of the ethylene resin used. The disparity in viscosity appears to contribute to the better film strength of the blends. Also, the best tear strength is obtained with blends in which the LLDPE itself has good film tear and impact properties. Such blends result in films with good tear and impact properties, and the higher modulus characteristic of a higher density LLDPE film.

Generally, the acrylic polymers used in the practice of the present invention are amorphous. While any acrylic polymer may be used for the purposes herein, those having a melt flow rate of about 0.5 to about 10 g/10 min., preferably about 2 to about 6 g/10 min., as determined by condition H-ASTM-D-1238- 63T, are generally preferred.

Illustrative of acrylic polymers which are useful herein are those derived, for example, from one or more monomers having the general formula:

wherein R is hydrogen, methyl or ethyl and R' is alkyl having from 1 to 8 carbon atoms. Typical monomers within the scope of the aforementioned formula are, for example, acrylic acid, methacrylic acid and esters of acrylic acid or methacrylic acid, such as methyl acrylate, ethyl acrylate, butyl acrylate, methyl methacrylate, ethyl methacrylate, butyl methacrylate and the like. For purposes of the present invention poly(methyl methacrylate) is preferred.

Compatibilizers can be used in small amounts up to about 2 weight percent of the composition. Suitable compatibilizers include block copolymers of styrene-ethylene propylene-styrene (Kraton G), block copolymers of styrene and ethylene (Shelvis) and ethylene propylene copolymers (Vistalon 3707) and ethylene-methyl acrylate copolymer.

The resin blends and films are made in the conventional manner. Preferably, films are made by blown film extrusion using conventional techniques to obtain films which are generally from about 0.5 to 5 mils in thickness.

The following non-limiting examples are illustrative of this invention. Unless otherwise noted all parts are by weight.

EXAMPLES 1-4

Dry blends of linear low density copolymer (LLDPE) with poly(methylmethacrylate) (Plexiglas, sold by Rohm & Haas Co.) were dry blended at the extruder hopper. Blown films having a 0.75 mil gauge were produced at 2.5:1 BUR at about 90 lbs/hr. output at a melt temp. of 450° F. The resultant film properties are summarized in Table I below. The films were tested using standard industrial ASTM procedures.

TABLE I

| Properties | Example 1 LLDPE* | Example 2 +1% PMMA** | Example 3 +3% PMMA** | Example 4 +5% PMMA** |
|---|---|---|---|---|
| MD PPT Tear (cm) | 5.5 | 5.5 | 5.1 | 4.7 |
| MD Elmendorf Tear (g/mil) | 102 | 126 | 164 | 142 |
| MD Elongation (%) | 431 | 471 | 551 | 580 |
| TD Elongation (%) | 674 | 794 | 766 | 708 |
| MD Toughness (ft-lbs/in³) | 1123 | 1380 | 1398 | 1408 |
| TD Toughness (ft-lbs/in³) | 1042 | 1481 | 1284 | 1331 |
| MD 1% Secant Modulus (psi) | 35467 | 35175 | 41909 | 44319 |

*Ethylene-hexene copolymer having a density of 0.921 and a melt index of 0.75.
**Plexiglas VS (poly(methylmethacrylate)) commercially available from Rohm & Haas.
PPT = puncture propagation tear
TD = transverse direction
MD = machine direction The physical properties identified in the Table demonstrate the improvement in LLDPE film strength by adding 1, 3 and 5% acrylic polymer to the LLDPE.

COMPARATIVE EXAMPLES 5-8

Blends of low density polyethylene (LDPE) with poly(methyl-methacrylate) (PMMA)(Plexiglas, Rohm & Haas) were dry blended at the extruder hopper. Blown films having a 0.75 mil gauge were produced at 2.5:1 BUR, 2.4 lb./hr. output at a melt temperature of 375° F. The films were tested using ASTM procedures. The results are summarized in Table II below.

TABLE II

| | Example 5 LDPE CONTROL | Example 6 LDPE +1% PMMA | Example 7 LDPE +3% PMMA | Example 8 LDPE +5% PMMA |
|---|---|---|---|---|
| Elmendorf Tear (g/mil) MD | 226 ± 28 | 219 ± 24 | 221 ± 43 | 222 ± 37 |
| Spencer Impact (g/mil) | 471 ± 76 | 472 ± 49 | 479 ± 85 | 473 ± 97 |
| Puncture Propagation Tear (cm) | 5.7 | 5.4 | 5.1 | 5.4 |
| 1% Secant Modulus (psi) MD | 25510 | 26000 | 28670 | 31580 |

± is a standard deviation

EXAMPLES 9-12

Linear low density polyethylene (LLDPE) and PMMA were blended, blown films were prepared from the blends, and the films were tested according to the procedures described in Examples 5-8. The results are summarized in Table III below.

TABLE III

| | Example 9 LLPDE CONTROL | Example 10 LLDPE +1% PMMA | Example 11 LLDPE +3% PMMA | Example 12 LLDPE +5% PMMA |
|---|---|---|---|---|
| Elmendorf Tear (g/mil) MD | 417 ± 54 | 414 ± 52 | 417 ± 71 | 365 ± 101 |
| Spencer Impact (g/mil) | 2100 ± 364 | 2190 ± 343 | >3700 | >3700 |
| Puncture Propagation Tear (cm) | 4.6 | 4.4 | 4.2 | 4.3 |
| 1% Secant Modulus (psi) MD | 30240 | 30110 | 32970 | 36530 |

EXAMPLES 13-16

On a larger scale, films were prepared at 0.75 mil gauge, 2.5:1 BUR, 155 lb./hr. output, 416°-433° F. melt temperature. The films were tested and compared as described in Examples 5-12. The results are summarized in Table IV below.

TABLE IV

| | Example 13 LDPE CONTROL | Example 14 LDPE +5% PMMA | Example 15 LLDPE CONTROL | Example 16 LLDPE +5% PMMA |
|---|---|---|---|---|
| Elmendorf Tear (g/mil) MD | 53 ± 3 | <10 | 402 ± 45 | 369 ± 77 |
| Spencer Impact (g/mil) | 345 ± 27 | 473 ± 104 | 761 ± 111 | >1400 |
| Puncture Propagation Tear (cm) | 6.64 | 6.45 | 4.30 | 4.36 |
| 1% Secant Modulus (psi) MD | 27530 | 37910 | 27790 | 36370 |

The results show that the blend using LLDPE unexpectedly significantly improves the Spencer impact strength and maintains or improves the excellent tear strength of LLDPE blown films particularly in large scale production. In contrast, the blend using LDPE does not improve the impact strength of LDPE blown films and adversely affects their tear strength in large scale production.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A blown film made from a blend comprising:
   (i) from about 90 to 99 weight percent of a linear low density ethylene copolymer of ethylene and a higher olefin having 4 to 8 carbon atoms (LLDPE), said LLDPE copolymer prepared by low pressure techniques and said copolymer having a density less than about 0.94 g/cc; and (ii) from about 1 to about 10 percent by weight, of the total composition, of poly(methyl methacrylate) polymer.

2. The film of claim 1 wherein said low density linear ethylene copolymer is a copolymer of ethylene and 1-hexene.

3. The film of claim 1 wherein said low density linear ethylene copolymer is a copolymer of ethylene and 1-octene.

4. The film of claim 1 wherein said low density linear ethylene copolymer is a copolymer of ethylene and 1-butene.

5. A method of improving the physical properties of a film prepared from a low density linear ethylene copolymer of ethylene and higher olefin (LLDPE), said LLDPE prepared by low pressure techniques, said method comprising blending with said low density linear ethylene copolymer of ethylene and higher olefin from about 1 to about 10 weight percent, based on the total composition, of poly(methyl methacrylate).

6. The method of claim 5 wherein said low density linear ethylene copolymer of ethylene and a higher olefin is selected from the group consisting of a copolymer of ethylene and 1-hexene, a copolymer of ethylene and 1-butene and a copolymer of ethylene and 1-octene.

* * * * *